May 5, 1931.  A. C. SCHUEREN  1,803,489
MEAT CUTTING DEVICE
Filed Nov. 12, 1928
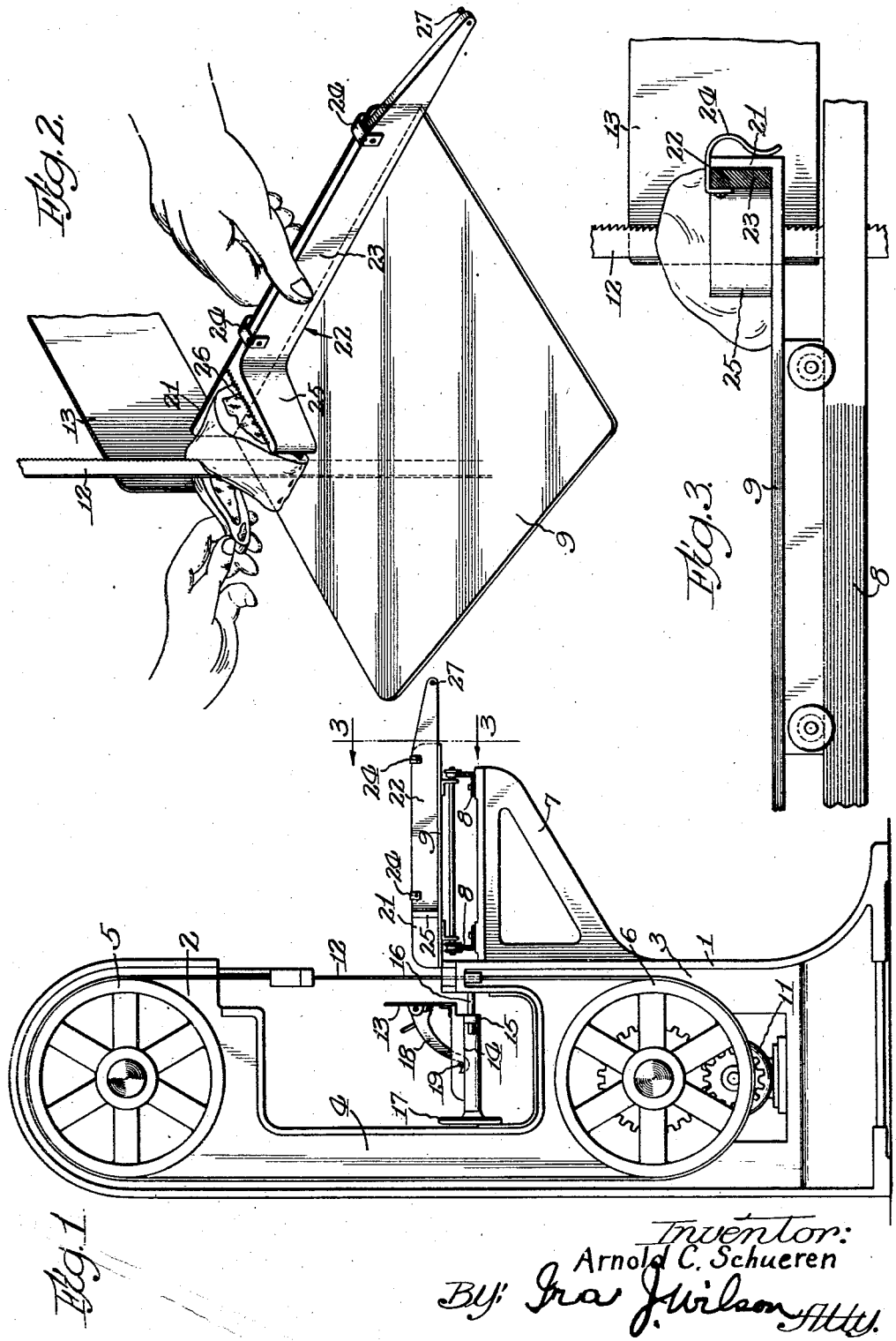

Patented May 5, 1931

1,803,489

UNITED STATES PATENT OFFICE

ARNOLD C. SCHUEREN, OF CHICAGO, ILLINOIS, ASSIGNOR, BY MESNE ASSIGNMENTS, TO VAUGHAN COMPANY, A CORPORATION OF ILLINOIS

MEAT-CUTTING DEVICE

Application filed November 12, 1928. Serial No. 318,665.

This invention relates to cutting machines in general and more particularly to meat cutting machines of the type disclosed in the patent of J. W. Vaughan No. 1,511,788, issued October 14, 1924.

In cutting machines in general and more particularly in machines of the above type, it is highly desirable when cutting meat, bone, fish and the like to protect the hand of the operator from injury, while making cuts on small pieces of material.

The primary object of this invention is accordingly to provide a device adapted to be used in connection with machines of the above type for holding small pieces of material in proximity to the saw blade whereby danger of injury to the hand of the operator is eliminated.

Other and further objects of this invention will be apparent as the same becomes better understood from an examination of the specification and claim in connection with the accompanying drawings wherein, Fig. 1 is a side elevation of a meat cutting machine embodying this invention, Fig. 2 is an enlarged fragmentary perspective view of a part of the machine, and Fig. 3 is a fragmentary section taken at the line 3—3 of Fig. 1.

Referring to the drawings more particularly, numeral 1 represents the frame of a meat cutting machine of the band saw type, such frame being similar to that shown in the aforementioned patent. The frame 1 consists of a casting having an upper web portion 2, a lower web portion 3 and a restricted integral connecting web portion 4. Carrying wheels 5 and 6 are mounted in the web portions 2 and 3 respectively.

A bracket 7 is provided as in the aforesaid patent for supporting a pair of horizontal tracks 8 on which is mounted a work table 9 having an upturned flange 21 along one edge thereof.

The lower blade carrying wheel 6 is mounted on a spindle which is driven through suitable gearing by a motor 11 mounted in the frame 1.

The work table 9 is movable outside of the blade 12 in a direction parallel to the plane of said blade and transverse to the movement thereof. A flat gauge member 13 is provided which is adjustable about a horizontal pivot either to a plane normal to that of the work table or to a plane substantially parallel to that of the work table. The gauge 13 is pivoted at its lower edge to one end of a carriage 14. The carriage 14 is provided with a pair of spaced lugs (not shown) which have threaded therethrough a screw (not shown) which extends from the frame support through said lugs. A bearing rod 16 transversely spaced with respect to the screw also extends from the frame support and is parallel to said screw. The rod 16 extends through a lug 15 on the side of the carriage opposite the aforementioned lugs to slidably support the said side of the carriage. A wheel 17 operates as a means for adjusting the position of the carriage along the screw for relatively adjusting the position of the gauge 13 with respect to the work table. The carriage is constructed to afford an opening which is adapted to receive a latch member 18 when the gauge 13 is depressed to its inoperative position. The latch 18 is pivoted to the back of the gauge 13 and includes a hook portion at the rear end of said latch which is normally held in position for engagement with a lug 19 on the carriage by a spring (not shown) acting between the underside of said latch and the back of said gauge. All of the aforedescribed parts are old and are more particularly described in the copending application of J. W. Vaughan Serial No. 133,786, filed September 7, 1926.

In cutting meat, for example, or other material, the same is held against the gauge 13 and the back 21 of the work table, and the latter moved transversely on its tracks to cause the saw blade 12 to slice the meat. In slicing small portions of meat, as, for example, in making the final slice on a piece of meat, there is great danger of cutting the hand when the piece is held against the gauge and the back of the work table by hand. In order to obviate this danger I provide a movable L-shaped member 22 comprising a horizontally extending stock 23 which slidably fits up against the back of the work table and is detachably secured thereto by means of longitudinally spaced spring clips 24 whereby said member may be removed from the work table or readily attached thereto, as desired. The member 22 is provided at its inner end with a laterally extending jaw 25 having a series of teeth 26 on its inner face to facilitate engagement with the meat or other material to be cut. The outer end of the member 22 is provided with a stop 27 adapted to engage with the outer edge of the back of the work table to limit the movement of said member 22 toward the saw blade.

In operation the member 22 may be positioned to engage the material to be cut to hold the same against the gauge 13 and may be adjustably moved inwardly on the work table by manually grasping the stock 23, as shown in Fig. 2, as the cutting proceeds.

The advantages of the device will be apparent without further description.

I am aware that many changes may be made without departing from the principles of this invention and I therefore do not wish to be limited to the details shown or described.

I claim:—

In a meat cutting machine, a band saw, means for moving said band saw, a work support positioned adjacent said saw and to one side thereof, a work table upon said support and movable past said saw, said table having an upturned flange along its rear edge and extending toward said saw, an L-shaped guide positioned on said table comprising a stock portion slidable along said flange and an integral laterally extending jaw portion for engaging material to be cut, and resilient U-shaped clamps engaging said stock portion and said flange for removably securing said stock portion in sliding contact with said flange.

In witness of the foregoing I affix my signature.

ARNOLD C. SCHUEREN.